(12) United States Patent
Memon

(10) Patent No.: US 6,884,831 B1
(45) Date of Patent: Apr. 26, 2005

US006884831B1

(54) MODIFIED ASPHALT WITH PARTITIONING AGENT

(76) Inventor: Mohammed Memon, 46252 Hollymead Pl., Sterling, VA (US) 20165

( * ) Notice: Subject to any disclaimer, the term of this patent is extended or adjusted under 35 U.S.C. 154(b) by 113 days.

(21) Appl. No.: 10/330,894

(22) Filed: Dec. 27, 2002

(51) Int. Cl.$^7$ ................................ C08L 95/00
(52) U.S. Cl. .................... 524/68; 523/203; 523/206; 523/210; 524/71
(58) Field of Search ............... 523/205–207, 523/210; 524/68, 71; 624/68

(56) References Cited

U.S. PATENT DOCUMENTS 2,779,745 A * 1/1957 Howland .................. 523/205
6,444,731 B1 9/2002 Memon

* cited by examiner

*Primary Examiner*—Peter Szekely
(74) *Attorney, Agent, or Firm*—Lawrence E. Laubscher, Jr.

(57) ABSTRACT

A modified asphalt and method for making the same is characterized by the addition of a partitioning agent to a polymer modifier material such as synthetic rubber to prevent reagglomeration of the rubber. The partitioning agent reduces the time required to disperse the modifier material in asphalt to be modified and also reduces the viscosity of the modified asphalt so that the modified asphalt is easier to handle.

10 Claims, 1 Drawing Sheet

MODIFIED ASPHALT WITH PARTITIONING AGENT

BACKGROUND OF THE INVENTION

The use of polymers to make polymer modified asphalt (PMA) is growing nationally and internationally. The increased use of polymers to modify asphalt is because most base or virgin asphalts are not suitable for use in different environments owing to different geographical and temperature conditions around the country. In order to satisfy the demand for more polymers, manufacturers are seeking to increase production, especially of less expensive polymers which are suitable for asphalt modification.

One type of economical polymer which is readily available at a reasonable price is synthetic rubber or butadiene back bone polymer because of it's high volume of consumption. Most of these commodity type polymers reagglomerate after grinding into crumb rubber, which is a major drawback to their acceptance by the asphalt modification industry. The present invention relates to a method for making a modified asphalt using synthetic rubber which prevents reagglomeration of the rubber. This reduces the dispersion time of the polymer into the asphalt and also decreases the viscosity of the modified asphalt.

BRIEF DESCRIPTION OF THE PRIOR ART

Modified asphalts including polymer and crumb rubber are well-known in the patented prior art, as evidenced by the Memon U.S. Pat. No. 6,444,731. This patent discloses the use of furfural or vegetable oil as a dispersion agent for the modifier material which comprises butadiene back bone polymers or crumb rubber to form a treated modifier material which disperses quickly into asphalt. The rapid dispersal of the modifier material reduces the production time of the modified asphalt, thereby reducing its cost. In addition, the modified asphalt has improved low and high temperature rheological properties.

While the prior modified asphalts operate satisfactorily, there is one drawback to the efficient production thereof. This is the tendency of the polymer and crumb rubber to reagglomerate which reduces the homogeneity of the asphalt. This in turn increases the cost of manufacturing and handling the modified asphalt.

SUMMARY OF THE INVENTION

The present invention was developed in order to overcome these and other drawbacks of prior polymer modified asphalts by providing improved treatments of the modifier material before it is mixed with the asphalt. Specifically, the modifier is treated with a partitioning agent such as a polyethylene wax and phenyl formaldehyde resin so that the modified asphalt resists reagglomeration. The resulting product has reduced viscosity and thus is more suitable for pumping which makes the asphalt easier to handle for construction projects such as paving a road or a parking lot.

The invention further utilizes a butadiene back boned polymer as the modifier for the asphalt. These polymers include Soloprene 1205 and 1502 elastomer which are found in pulverized or crumb rubber.

BRIEF DESCRIPTION OF THE FIGURE

Other objects and advantages of the invention will become apparent from a study of the following specification when viewed in the light of the accompanying drawing, in which.

DETAILED DESCRIPTION

Figure 1:
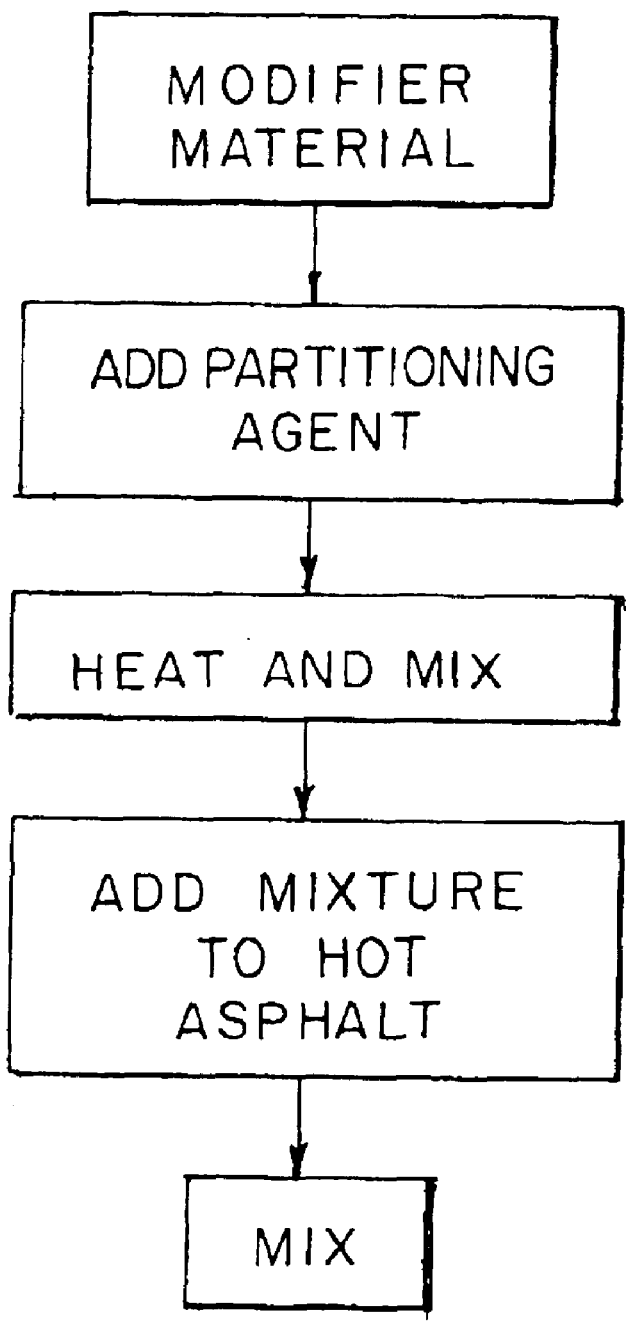
FIG. 1 is a flow diagram showing the method steps for making modified asphalt according to a preferred embodiment of the invention.

The preferred materials used to modify asphalt according to the invention are synthetic rubbers such as butadiene back boned polymers. Specific examples of such rubbers are Soloprene 1205, from Dynasol, which is a butadiene back boned styrene butadiene block copolymer and 1502 elastomer, also from Dynasol, which is a butadiene back boned styrene butadiene rubber. Both of these synthetic rubbers are commodity polymers which are readily available and inexpensive. The polymers are preferably ground or crushed into smaller particulates.

The polymers are treated with a partitioning agent, preferably by spraying the agent onto the polymer particles and then mixing the same to form a treated modifier material. A preferred partitioning agent is a polyethylene wax, a polymethylene wax (i.e. Fischer-Tropsch wax such as EnHance™ polymethylene hydrocarbon manufactured by Plastic Technology Service Ltd.) or a linear aliphatic hydrocarbon polymer. In addition, a phenyl formaldehyde resin is mixed with the wax or polymer prior to mixing with the synthetic rubbers. Synthetic polymer is preferred over natural polymer because it has different properties which assist with the manufacturing process. Specifically, the combination of synthetic linear aliphatic hydrocarbon polymer and phenyl formaldehyde resin acts as a good partitioning agent for synthetic rubbers in that they prevent reagglomeration of the synthetic rubber modifier.

The treated polymer modifier material is heated and mixed so that the partitioning agent is thoroughly distributed throughout the synthetic rubber. Heating is conducted in the range of between 90° C. and 1500° C., but preferably in the range of 160° C. and 210° C. Mixing occurs for up to 10 minutes, but less time is normally required because of the properties of the partitioning agent.

The treated polymer material is then added to hot asphalt, preferably having a temperature of 160° C.–210° C. and mixed, preferably by stirring. The resulting modified asphalt resists reagglomeration of the synthetic rubber and is characterized by reduced viscosity and improved rheological properties of both high and low temperatures.

Modified polymer according to the invention and the corresponding unmodified polymer were tested for reagglomeration by a conventional industrial protocol using Instron's Tensile Instrument. The test results are shown in Table I.

TABLE I

| | Electro-mechanical Force for Untreated Polymer | Electro-mechanical Force for Treated Polymer | Dispersion Time | Viscosity @ 135° C. cP Using 10% of Polymer |
|---|---|---|---|---|
| Soloprene 1205 (SB0) Un-Treated | 30 Kilo Force | | 40 minutes | 4700 |
| Soloprene 1205 (SB) Treated | | 8 Kilo Force | 5 minutes | 2730 |
| 1502 (SB) Elastomer Un- | 150 Kilo Force | | 45 minutes | 6100 |

TABLE I-continued

| | Electro-mechanical Force for Untreated Polymer | Electro-mechanical Force for Treated Polymer | Dispersion Time | Viscosity @ 135° C. cP Using 10% of Polymer |
|---|---|---|---|---|
| Treated 1502 (SB) Elastomer | | 19 Kilo Force | 7 minutes | 3310 |
| Treated SBS 411 | 20 Kilo Force | | 35 minutes | 5710 |
| Un-Treated SBS 411 Treated | | 4 Kilo Force | 5 minutes | 3140 |

An acceptable number for reagglomeration is 20 Kilo force or lower. Table I establishes that the partitioning agent according to the invention is extremely beneficial to prevent reagglomeration of the synthetic rubber modifier. After use of the partitioning agent, styrene butadiene (SB) type polymer acts just like a styrene butadiene styrene (SBS) type polymer.

Another benefit attendant with the invention is the reduction in dispersion time of polymer in asphalt. Dispersion times which are almost eight times faster than those of prior asphalt modification techniques can be achieved. This is because once the partitioning agent enters the polymer modifier material, the partitioning agent melts when added to hot asphalt due to its low melting point. The change in state creates a new hydraulic pressure which breaks the particles of polymer in the modifier.

A further benefit of polymer modified asphalt including a partitioning agent is the reduced viscosity of the asphalt. Such an asphalt may be highly concentrated and transported via a pump which facilitates the construction of roadways, parking lots and the like from the modified asphalt.

Table II shows the continuous performance grade (PG) of neat, untreated polymer modified asphalt (PMA) and treated polymer modified asphalt.

TABLE II

| Asphalt | Polymer | Neat PG | Untreated PMA PG | Treated PMA PG |
|---|---|---|---|---|
| BP Asphalt | Dynasol Soloprene 1205 4% Polymer Treated or Untreated | 65-23 | 80-20 | 82-23 |
| Irving Asphalt | 4% Polymer Treated or Untreated | 53-35 | 69-33 | 70-34 |
| BP Asphalt | Dynasol 1502 Elastomer 4% Polymer Treated or Untreated | 65-23 | 81-21 | 83-23 |
| Irving Asphalt | 4% Polymer Treated or Untreated | 53-34 | 70-33 | 71-35 |

As shown in Table II, the partitioning agent impacts the polymer and shows slight improvement for both high and low temperature rheological properties over untreated polymer. The performance grades for the treated polymer are higher than those for untreated polymer.

While the preferred forms and embodiments of the invention have been illustrated and described, it will be apparent to those of ordinary skill in the art that various changes and modifications may be made without deviating from the inventive concepts set forth above.

What is claimed is:

1. A method for making a modified asphalt, comprising the steps of:

(a) adding a partitioning agent to a modifier comprising a synthetic rubber;

(b) heating the treated modifier material;

(c) adding the treated modifier material to hot asphalt having a temperature of 160°–210° C.; and (d) mixing the combination of treated modifier and hot asphalt to produce a modified asphalt which resists reagglomeration of the synthetic rubber and which has reduced viscosity, wherein said partitioning agent comprises phenyl formaldehyde resin and at least one of a polyethylene wax, a polymethylene wax (Fisher-Tropsch wax), or a linear aliphatic hydrocarbon polymer.

2. A method as defined in claim 1, wherein said modifier comprises a butadiene back boned polymer.

3. A method as defined in claim 2, wherein said modifier comprises a styrene butadiene polymer.

4. A method as defined in claim 2, wherein said modifier is in the form of crumb rubber.

5. A method as defined in claim 2, wherein said treated modifier material is heated to 160°–210° C.

6. A method as defined in claim 2, wherein said partitioning agent is sprayed on said modifier material.

7. A modified asphalt, comprising (a) an asphalt having a temperature of 160°–210° C.; and (b) a modifier comprising a synthetic rubber material treated with a partitioning agent to facilitate dispersion of the modifier within the asphalt, said modified asphalt having a reduced viscosity and resisting re-agglomeration of the synthetic rubber material, wherein said partitioning agent comprises a phenyl formaldehyde resin and at least one of a polyethylene wax, a polymethylene wax (Fisher-Tropsch wax), or a linear aliphatic hydrocarbon polymer.

8. A modified asphalt as defined in claim 7, wherein said modifier comprises a butadiene back boned polymer.

9. A modified asphalt as defined in claim 8, wherein said modifier comprises a styrene butadiene polymer.

10. A modified asphalt as defined in claim 8, wherein said modifier is in the form of crumb rubber.

* * * * *